United States Patent [19]

Kintner

[11] 4,234,015
[45] Nov. 18, 1980

[54] VALVE

[76] Inventor: Edwin K. Kintner, R.D. 4, Box A 231, Johnstown, Pa. 15905

[21] Appl. No.: 970,119

[22] Filed: Dec. 18, 1978

[51] Int. Cl.³ .............................................. F16K 27/04
[52] U.S. Cl. ......................... 137/625.18; 137/625.48; 251/63.6; 251/367
[58] Field of Search .............. 137/625.48, 595, 625.63, 137/625.18; 251/63.6, 367

[56] References Cited

U.S. PATENT DOCUMENTS

| 948,725 | 2/1910 | Freeman | 137/595 |
| 3,052,444 | 9/1962 | Kintner | 251/63.6 X |
| 3,415,282 | 12/1968 | Zoludow | 137/625.48 |
| 3,625,246 | 12/1971 | Reaves | 137/625.6 C X |

FOREIGN PATENT DOCUMENTS 1114731 10/1961 Fed. Rep. of Germany .......... 251/63.6

Primary Examiner—Arnold Rosenthal
Attorney, Agent, or Firm—William J. Ruano

[57] ABSTRACT

A four-way valve powered by a single pneumatic power unit enclosed in a cylindrical portion which is detachably secured to a second cylindrical portion which encloses three or more pistons whose piston rod is directly connected to that of the power unit. An inlet port in the second cylindrical portion alternately discharges milk or other liquid through one of two outlet ports on the other side thereof, depending upon the position of the operating piston of the power unit. At the same time, inlet and outlet ports are open for the flow of a second type of liquid, such as cream, across the second cylindrical portion.

1 Claim, 3 Drawing Figures

VALVE

This invention is an improvement over my U.S. Pat. No. 3,052,444 and relates to valves and, more particularly, to throttling valves and piston valves of the on-off type. Such valves may be automatically operated, such as by air pressure, or may be manually operated, as desired.

An outstanding disadvantage of conventional heavy duty valves used for the control of the flow of liquid, such as milk, when operated by air pressure, is that often times when leakage develops, air escapes into the milk, or perhaps the milk and air chamber and causing operating difficulties.

A disadvantage of the FIG. 4 modification of the valve in my former U.S. Pat. No. 3,052,444 is that two identical power units were required, each similar to that shown at the left of FIGS. 1 and 2 but added to both sides of the valve for milk flow.

A still further disadvantage of conventionally used valves for controlling the flow of milk and the like is that they are relatively complicated in construction and cannot be readily taken apart without disturbing the air operating mechanism, for the purpose of cleaning from time to time as in necessary to insure cleanliness of the milk or other liquid.

An object of my invention is to provide a novel valve which is devoid of the above named disadvantages and which is of such construction as to prevent the possibility of flow of air under pressure in the air cylinder into the liquid or vice versa.

A further object of my invention is to provide a novel 4-way valve for controlling two different types of liquids, such as cream and milk separately, with the use of a single fluid operated power unit, instead of multiple power units as required in my former patent.

A still further object of my invention is to provide an air operated valve of the throttling or piston type which is of relatively simple construction and which can be readily taken apart in a manner so that the parts through which the liquid flows may be easily and quickly separated from the air piston or power operating parts and thoroughly cleaned from time to time, as desired, without disturbing the power operating parts.

Other objects and advantages of my invention will become more apparent from a study of the following description taken with the accompanying drawings wherein.

Figure 1:
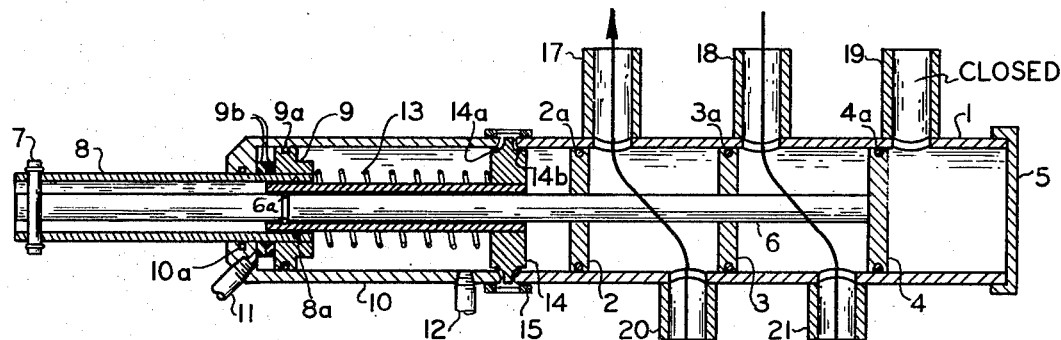
FIG. 1 is a longitudinal, cross-sectional view of a throttling valve embodying my invention and shown in one position.
Figure 2:
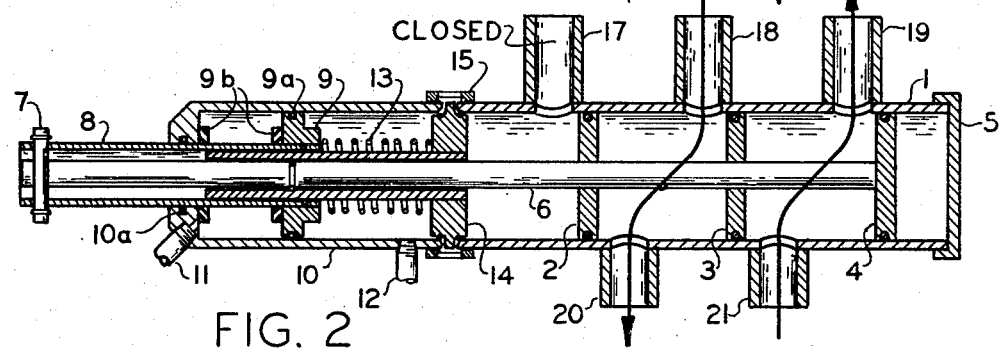
FIG. 2 is a longitudinal, cross-sectional view of the valve shown in FIG. 1 but in another position.
Figure 3:
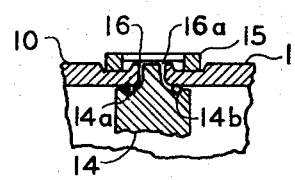
FIG. 3 is a fragmentary enlarged view showing the manner the valve body parts of FIGS. 1 and 2 are clamped together.

Referring more particularly to FIGS. 1 and 2 of the drawings, numeral 1 denotes a valve body, preferably of stainless steel or other suitable material which will not contaminate liquid flowing therein as the result of oxidation or the like. Numeral 5 denotes a cap, preferably of the same material, welded or otherwise integrally secured to body 1 and having a threaded coupling element integrally attached to the end portion thereof. Stem 6 has a peripheral groove containing an O sealing ring 6a which forms a seal with the interior of the tubular part of a stationary bearing which is integrally secured to an annular part 14 of the stationary bearing, to serve as a guide for both the valve stem 6 and air piston 9. Air piston 9 is integrally secured to a tube 8 having an O-ring 8a in an internal peripheral groove to form a seal with the exterior surface of the tubular part of the stationary bearing.

The left extremity of tube 8, as viewed in FIG. 1, is rigidly connected by a piston connecting pin 7 to the left extremity of valve stem 6 so as to rigidly connect the throttling valve and air piston 9 together so they will move in unison. A helical compression spring 13 is provided between piston 9 and part 14 of the staionary bearing so as to normally urge the air piston 9 to the left to the position shown in FIG. 1, wherein the two stop cushioning rings 9b come into contact to cushion and limit leftward movement of the air piston 9.

Air inlet and outlet ports 11 and 12, respectively, are provided which may be connected to a conventional air solenoid (not shown) for selectively introducing air under pressure into inlet connection 11 to effect movement of the air piston 9 and valve stem 6 to the right in unison until the valve is in the position as shown in FIG. 2. Of course, upon release of air pressure in the chamber to the left of piston 9, return spring 13 will effect movement to the left as shown in FIG. 1. Air piston 9 has a peripheral groove provided with an O-ring 9a to form a seal with the internal surface of air chamber 10. Another seal is formed by O-ring 10a at the end portion of the air chamber which contacts the external surface of sleeve 8.

It will be noted that the valve generally compreses two portions, an operating portion to the left of stationary bearing part 14 and a working portion to the right thereof, through which milk or other liquid flows. These two portions are separate but may be clamped together by a clamp 15 of any well known type, such as one with a thumb screw for shrinking the diameter. Peripheral grooves having O-rings 14a and 14b are provided between the stationary part 14, air chamber 10 and valve body 1 to provide a seal therebetween. Passageways 16 and 16a lead from these grooves to the outside atmosphere so that in the event of leakage, either of air under pressure in chamber 10 or of milk in body 1, such leakage will be to the outside atmosphere, rather than permitting air to flow into the milk, or vice versa. In case of leakage of the milk through passageway 16a, a visible indication of the leakage is provided so as to warn the attendant to replace the O-ring 14b.

It will be noted further that air within the air chamber 10 cannot leak directly into the milk chamber or valve body 1 through any other path, and whatever leakage that can occur would be directly to the outside atmosphere. For instance, if compressed air leaks past O-ring 8a or 9a and 10a, it will go to the outside atmosphere, since the space between stem 6 and tube 8 is exposed to outside atmosphere. This is also true of leakage of milk along stem 6 and past O-ring 6a which will flow to the outside atmosphere where it will be readily detected. In short, therefore, there is no direct path between the air cylinder and milk chamber which would permit mixing of air and milk.

It will be readily seen how extremely easy it is to clean the interior of valve body 1, which is accomplished simply by unclamping clamp 15 and withdrawing only the valve body 1 so that it may be separately washed thoroughly, particularly on the inside, without disturbing the valve 5 and its operating parts which seldom have to be taken apart. Being a one piece stainless steel body, the removed valve body assembly may be immersed in hot water for cleaning. Pistons 2, 3 and 4 provided with O-sealing rings 2a, 3a and 4a, respectively, are all rigidly mounted on piston rod or shaft or stem 6.

In operation, inlet 18, depending upon the position of the pistons in FIGS. 1 and 2, will feed milk or other fluid alternately either through outlet 21 or outlet 20. At the same time a different liquid (or fluid) such as cream may flow through other ports of the valve.

More specifically, when fluid under pressure is introduced into inlet pipe 12 and exhausted through pipe 13, the assembly will assume the position shown in FIG. 1 wherein milk or other fluid will enter inlet port 18 and exhaust through port 21.

A different liquid, such as cream, will enter port 20 and exit through port 17. Port 19 is closed.

However, when fluid under pressure is introduced into inlet pipe 11, exhausting through pipe 12, pistons 2, 3 and 4 will move to the position shown in FIG. 2.

Now milk will enter inlet port 18 and exhaust through port 20, while another liquid, such as cream, will enter port 21 and exhaust through port 19. Port 17 is now closed. Thus a 4-way valve is provided which can accomodate two types of liquid with but a single air-operated power unit, thus providing great economy in manufacture as well as in maintenance of the assembly. For example, when it is desired to clean the main valve portion, it is simply detached at 15 and the housing portion at the right thereof is removed from the power unit so that it can be thoroughly washed by immersion in cleaning water and detergent without wetting the air-operated power unit.

While a four way valve has been described in combination with but a single pneumatic power operator, it should be noted that additional openings may be provided and additional pistons attached to stem 6 making it a 5, 6 or higher operating valve without departing from the scope of the present invention.

Thus it will be seen that I have provided a significant improvement in the art eliminating the necessity of additional power operating units to increase the capacity or capabilities of the valve enabling it to control the flow of various liquids instead of a single liquid and, at the same time, making it extremely easy to clean without immersing the power unit in cleaning liquid, reducing the cost and time required for sanitary maintenance.

While I have illustrated and described a single embodiment of my invention, it will be understood that this is by way of illustration only and that various changes and modifications may be contemplated in my invention and within the scope of the following claims:

I claim:

1. A valve assembly for controlling the flow of a plurality of different liquids simultaneously in a single cylinder, comprising a fluid operated power unit housed in a first cylindrical housing portion enclosing an operating piston, a second cylindrical housing portion detachably secured to said first cylindrical housing portion so as to form an enlongated cylinder of the same diameter, three ports on one side and two ports on the other side of said second cylindrical housing portion, three longitudinally spaced pistons rigidly attached to the stem of said power operating piston so as to move in unison therewith and so that the central piston thereof will selectively change the direction of flow through said second cylindrical housing portion of two different liquids alternately outwardly through said two ports, the remaining two pistons being arranged to alternately close the remaining two of said three ports, the central port of said three ports being always the inlet port for one of said liquids while the remaining of said three ports being alternately the outlet port for the other of said liquids, and a sealed cap closing the end of said second cylindrical housing portion, being readily removable from said first cylindrical housing portion for separate cleaning,—said fluid operated power unit being the sole power unit for all three of said pistons.

* * * * *